United States Patent
Collins et al.

(10) Patent No.: US 8,409,323 B2
(45) Date of Patent: Apr. 2, 2013

(54) CONTROL METHOD AND APPARATUS

(75) Inventors: Michael J. Collins, Lockport, NY (US); David F. Suggs, Eggertsville, NY (US); Sadashiv M. Swami, Tonawanda, NY (US); Richard M. Kelly, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 229 days.

(21) Appl. No.: 13/081,808

(22) Filed: Apr. 7, 2011

(65) Prior Publication Data

US 2012/0255436 A1 Oct. 11, 2012

(51) Int. Cl.
B01D 46/46 (2006.01)

(52) U.S. Cl. ............ 95/1; 95/8; 95/23; 95/54; 429/482; 429/495; 429/496

(58) Field of Classification Search .................. 95/1, 8, 95/23, 54; 96/4; 429/482, 495, 496
See application file for complete search history.

(56) References Cited

U.S. PATENT DOCUMENTS

| | | | |
|---|---|---|---|
| 5,021,137 A | | 6/1991 | Joshi et al. |
| 5,547,494 A | * | 8/1996 | Prasad et al. .................. 95/54 |
| 5,643,355 A | * | 7/1997 | Phillips et al. .................. 96/4 |
| 5,855,762 A | | 1/1999 | Phillips et al. |
| 5,902,379 A | * | 5/1999 | Phillips et al. .................. 96/4 |
| 6,290,757 B1 | | 9/2001 | Lawless |
| 6,352,624 B1 | | 3/2002 | Crome et al. |
| 6,368,491 B1 | | 4/2002 | Cao et al. |
| 6,475,657 B1 | | 11/2002 | Del Gallo et al. |
| 6,916,570 B2 | * | 7/2005 | Vaughey et al. .............. 429/489 |
| 7,153,559 B2 | * | 12/2006 | Ito et al. .......................... 428/173 |
| 7,846,236 B2 | * | 12/2010 | Del-Gallo et al. .................. 95/1 |
| 2003/0230196 A1 | * | 12/2003 | Kim .................................. 96/4 |
| 2004/0065541 A1 | | 4/2004 | Sehlin |
| 2006/0062707 A1 | | 3/2006 | Crome et al. |
| 2006/0236719 A1 | | 10/2006 | Lane et al. |
| 2007/0158329 A1 | | 7/2007 | Cao |
| 2009/0031895 A1 | | 2/2009 | Del-Gallo et al. |
| 2010/0116133 A1 | | 5/2010 | Reed et al. |
| 2010/0116680 A1 | * | 5/2010 | Reed et al. ..................... 205/344 |

FOREIGN PATENT DOCUMENTS

WO WO 2010/052641 A2 5/2010

* cited by examiner

*Primary Examiner* — Jason M Greene
*Assistant Examiner* — Anthony Shumate
(74) *Attorney, Agent, or Firm* — David M. Rosenblum

(57) ABSTRACT

A method and apparatus for controlling the electrical power applied to an electrically driven oxygen separation device having one or more composite membrane elements to separate oxygen from an oxygen containing feed. The composite membrane elements have a resistance increasing during the operation thereof that would act to reduce oxygen output if applied voltage were held constant. In order to increase the time interval for renewing the composite membrane elements, the electrical potential difference is controlled such that the electric current drawn by the elements remains at a substantially constant level by increasing the electrical potential difference as the resistance increases until a predetermined voltage level is reached. Once this level is obtained, the electrical potential difference is maintained at a constant level and the electric current being drawn and the oxygen output is allowed to decay to a predetermined low level after which the element or elements are replaced.

8 Claims, 2 Drawing Sheets

CONTROL METHOD AND APPARATUS

FIELD OF THE INVENTION

The present invention relates to a method and apparatus for controlling the electrical power applied to an electrically driven oxygen separation device employing one or more composite membrane elements having anode and cathode electrodes and an electrolyte situated between the anode and cathode electrodes to separate oxygen from an oxygen containing feed stream. More particularly, the present invention relates to such a method and apparatus in which a potential difference applied to the membrane elements is increased over time to maintain electric current drawn by the composite membrane element constant during the increase and is thereafter, held at a constant level.

BACKGROUND OF THE INVENTION

Electrically driven oxygen separation devices employ one or more composite membrane elements that have cathode and anode electrodes situated on opposite sides of an electrolyte to apply an electric potential difference to the electrolyte. The electrolyte is a ceramic material that at elevated temperature and upon the application of the potential difference is capable of oxygen ion transport when heated to an elevated operational temperature. When the electric potential difference is applied to the electrodes and the cathode electrode is contacted with an oxygen containing feed stream, oxygen ion transport will be induced through the electrolyte to separate the oxygen from the oxygen containing feed stream to produce molecular oxygen at the anode collector. Such oxygen separation devices can be used to purify the feed stream or to produce an oxygen product when the feed stream contains sufficient oxygen in case of air. Typically, the electrically driven oxygen separator has an electrically heated enclosure that contains the composite membrane elements to heat such membrane elements up to the operational temperature at which oxygen ion transport is possible through the electrolyte.

Although there are various forms of such electrically driven oxygen separation devices, the oxygen separation elements used in such separation devices all employ an electrolyte that is at least primarily an oxygen ion conductor such as gadolinium doped ceria or more exclusively an oxygen ion conductor such as Scandium and/or yytrium stabilized zironia and electrically conductive electrodes that can be an electrically conductive perovskite covered by a conductive current collector fabricated from silver. The composite membrane elements can take a variety of forms, such as a single tube, a series of tubes, flat plates and plate-like structures having integrally molded tubular projections. For example, as illustrated in US Patent Appln. Serial No. 2010/116133, an electrically driven oxygen separation device is illustrated that utilizes bundles of tubular elements that are connected by manifolds that are in turn enclosed in an electrically heated enclosure. Each tubular element is provided with a cathode layer, an anode layer and an electrolyte layer. Additionally, two current collector layers are located adjacent the anode and cathode layers where the electric potential difference is actually applied to the anode and cathode. Each of the cathode and anode layers is formed from $(La_{0.8}Sr_{0.2})_{0.98}Mn_{O3-\delta}$. The electrolyte layer is 6 mol % scandium doped zirconia. The current collector layers are formed from a powder of silver particles having surface deposits of zirconium oxide to inhibit aging of the current collector layers. In order to provide contact between the oxygen containing feed stream and the electrolyte and to allow diffusion of the oxygen to and from the electrolyte, all of such current collectors and electrodes are porous. In the foregoing published patent application, the tube bundles are located within a heated enclosure having an inlet to receive the oxygen containing feed stream and an outlet in flow communication with manifolds connected to the tubular elements. Heating elements are provided within the insulation of the enclosure in order to heat the interior of the enclosure and the composite membrane elements to an operational temperature at which oxygen ion transport through the electrolyte can occur.

As known in the art, the oxygen produced by the electrically driven oxygen separation devices will be in proportion to the current drawn by the composite membrane elements. The composite membrane elements and specifically, the elements employed in such elements, however, degrade or age over time principally due to closure of the pores, evaporation of metallic elements such as silver, silver migration from the cathode to the electrolyte, reactions occurring between the electrodes and the electrolyte and delamination of the current collector. As such elements age, the resistance of the elements will increase and therefore, if a constant potential difference or voltage were applied, the current would decrease over time and therefore, the oxygen produced by the separation device. It is therefore, known that the power supply that is used to produce the potential difference to be applied should be a constant current power supply. However, if a constant current is applied, the voltage will steadily increase until failure of the membrane elements occurs. This failure will occur over a known time period and consequently, renewal of the device is scheduled in a conservative fashion to allow the composite membrane elements to be replaced in advance of any possible failure. This being said, it is very desirable to allow the electrically driven oxygen separation device to function as long as possible between renewal intervals due to interruption in service that necessarily occurs during renewal. Still another recognized way to control the electrical power to the separation zones is to measure the current and adjust the voltage so that power dissipated (product of voltage and current) in the separation zone is held constant. This aids control of the temperature of the separation device since dissipated power results in heating of the separation device, and if this is held constant, then the temperature of the separation device remains constant. However, this method has the disadvantage, that as the resistance increase over time, the current and oxygen flow will naturally decrease.

A further problem arises during startup of the separation device. The typical operating temperature for the elements used in the composite membrane elements is between 600° C. and 800° C. It is known that care must be taken in starting up the oxygen separation device in that the membrane elements also generate heat and if full power were applied to both the composite membrane elements and the heated enclosure during startup, overheating can occur leading to premature degradation if not failure of the composite membrane elements.

As will be discussed, among other advantageous features, the present invention provides a method and apparatus for controlling the application of the electrical power within an electrically driven oxygen separation device that allows the separation device to be operated for a longer time period than the prior art before replacement of the composite membrane elements becomes necessary and to allow the monitoring of the separation device to determine when replacement is to be performed.

SUMMARY OF THE INVENTION

In one aspect, the present invention provides a method for controlling application of electrical power in an electrically driven oxygen separation device. In accordance with the method, part of the electrical power is applied in at least one separation zone of the electrically driven oxygen separation device in which an electrical potential difference is applied to anode and cathode electrodes of the at least one composite membrane element while heating the at least one composite membrane element to an operational temperature. This allows the separation of the oxygen from the oxygen containing feed stream by inducing oxygen ion transport in an electrolyte situated between the anode and cathode electrodes through the application of the electrical potential difference.

The at least one composite membrane element has a resistance increasing over time and during operation of the at least one composite membrane element. The electrical potential difference applied to the at least one composite membrane element is controlled such that an electric current drawn by the at least one composite membrane element remains at a substantially constant, predetermined electrical current level by increasing the electrical potential difference as the resistance increases until the electrical potential difference reaches a predetermined voltage level. After the predetermined voltage level is reached, the electrical potential difference is maintained at a constant voltage level. The constant voltage level is selected so as to be below a maximum voltage level at which the at least one composite membrane element will fail.

As can be appreciated, since the present invention contemplates an operation in which a constant current level is maintained for a certain time period and then the potential difference level is then held constant, while the composite membrane element will produce less oxygen as the resistance increases during the constant voltage hold, the electrically driven oxygen separation device can maintain a fixed flow of oxygen and maintain in service over a longer time period than had the current been maintained constant between renewal intervals. It is to be noted here that the term "composite membrane element" as used herein and in the claims encompasses an element in any form such as has been discussed above that has an ionic conducting electrolyte situated between anode and cathode electrodes and current collectors to which the potential difference is applied to the electrodes and therefore, the electrolyte. The composite membrane element could have multiple membrane elements which are electrically arranged in series, parallel or combination of both.

The electrical potential difference can be controlled by measuring the electric current and increasing or decreasing the electrical potential difference such that the electrical current remains at the substantially constant, predetermined electrical current level. While the electric current will decay over time when the electrical potential difference is maintained at the constant level, when the electrical current has decayed to a predetermined low electric current level, the application of the electrical potential difference ceases and the at least one composite membrane element is replaced.

The at least one separation zone can comprise a plurality of separation zones. In this regard, as used herein and in the claims, the term "plurality" means two or more. The at least one composite membrane element of each of the plurality of separation zones is contained in an electrically heated enclosure of the electrically driven oxygen separation device to heat the electrolyte to the operational temperature at which the electrolyte will be capable of oxygen ion transport. A further part of the electrical power is initially gradually supplied to the electrically heated enclosure during startup of the electrically driven oxygen separation device to gradually obtain the operational temperature within the electrically heated enclosure prior to applying the electrical potential difference. After the operational temperature has been obtained, during the startup of the electrically driven oxygen separation device, the electric potential difference is separately and gradually applied within each of the separation zones until the electrical current reaches the predetermined electrical current level and in accordance with a schedule. As per the schedule, the electrical potential difference is successively applied within the plurality of separation zones such that the electrical potential is applied within a successive separation zone only after the current drawn by the at one composite membrane element located within a preceding separation zone has reached a fixed percentage of the electrical current level and with the further part of the electrical power supplied to the electrically heated enclosure only supplied as necessary to maintain the operational temperature.

In another aspect, the present invention provides an apparatus for applying electrical power in an electrically driven oxygen separation device. In accordance with such aspect, at least one separation zone is provided having a DC power source for generating part of the electrical power and at least one composite membrane element housed within an electrically heated enclosure of the electrically driven oxygen separation device and connected to the DC power source. As a result, an electrical potential difference is applied to anode and cathode electrodes of the at least one composite membrane element, thereby to separate the oxygen from the oxygen containing feed stream by inducing oxygen ion transport in an electrolyte situated between the anode and cathode electrodes through the application of the electrical potential difference. An AC power supply is connected to the electrically heated enclosure for generating a further part of the electrical power and supplying the further part of the electrical power to the electrically heated enclosure to maintain the at least one composite membrane element at an operational temperature at which the electrolyte is capable of oxygen ion transport. The at least one composite membrane element has a resistance increasing over time and during operation of the at least one composite membrane element. A means is provided for controlling the electrical potential difference applied to the at least one composite membrane element such that the voltage of the electrical potential increases to maintain an electric current drawn by the at least one composite membrane element at a substantially constant, predetermined electrical current level as the resistance increases until the electrical potential difference reaches a predetermined voltage level and thereafter, to maintain the electrical potential difference at a constant voltage level when the electrical potential difference reaches the predetermined voltage level. The constant voltage level is selected so as to be below a maximum voltage level at which the at least one composite membrane element will fail.

The electrical potential controlling means can comprise the separation zone having a current sensor connected between the at least one power supply and the at least one electrically driven oxygen membrane element and configured to generate a current signal referable to a magnitude of the electrical current drawn by the at least one composite membrane element. Additionally, the DC power supply responsive to a voltage control signal and configured such that the electrical potential difference applied has an amplitude that varies in response to the voltage control signal. A programmable controller responsive to the current signal and programmed to generate the voltage control signal such that the electric current drawn by the at least one composite membrane element is maintained at the substantially constant, predetermined electrical current level as the resistance increases and to maintain the electrical potential difference at the constant voltage after the electrical potential difference reaches the predetermined voltage level.

The electric current decays over time when the electrical potential difference is maintained at the constant level and a means is provided for recording and accessing data referable to the electric current drawn by the at least one composite membrane element. Such means is connected to the controller such that when the electrical current has decayed to a predetermined low electric current level, an indication is supplied for replacement of the at least one composite membrane element.

The at least one separation zone can comprise a plurality of separation zones. A means is provided for controlling the supply of the further part of the electrical power generated by the AC power source. Such means is connected between the AC power source and the electrically heated enclosure and is responsive to a temperature control signal. A temperature sensor is contained in electrically heated enclosure and is configured to generate a temperature signal referable to temperature within the electrically heated enclosure. The programmable controller is programmed to generate the voltage control signal for each said DC power source in response to the electrical current signal of each of the plurality of separation zones and is also responsive to the temperature signal to generate the temperature control signal such that the operational temperature is maintained in the heated enclosure. The programmable controller programmed with a startup routine executing during startup of the electrically driven oxygen separation device to generate the temperature control signal and the voltage signal such that the further part of the electrical power generated by the AC power supply is gradually applied until the operational temperature is obtained within each of the plurality of separation zones. The electric potential difference is separately and gradually applied to the at one composite membrane element in each of the separation zones, once the operational temperature has been obtained, until the electrical current drawn reaches the predetermined electrical current level and in accordance with a schedule. In such schedule the electrical potential difference successively applied within the separation zones such that the electrical potential is applied within a successive separation zone only after the current drawn by the at one composite membrane element located within a preceding separation zone has reached a fixed percentage of the electrical current level and with the further part of the electrical power supplied to the electrically heated enclosure only supplied as necessary to maintain the operational temperature.

BRIEF DESCRIPTION OF THE DRAWINGS

While the specification concludes with claims distinctly pointing out the subject matter that Applicants regard as their invention, it is understood that the present invention will be better understood when taken in connection with the accompanying drawings in which:

DETAILED DESCRIPTION

Figure 1:
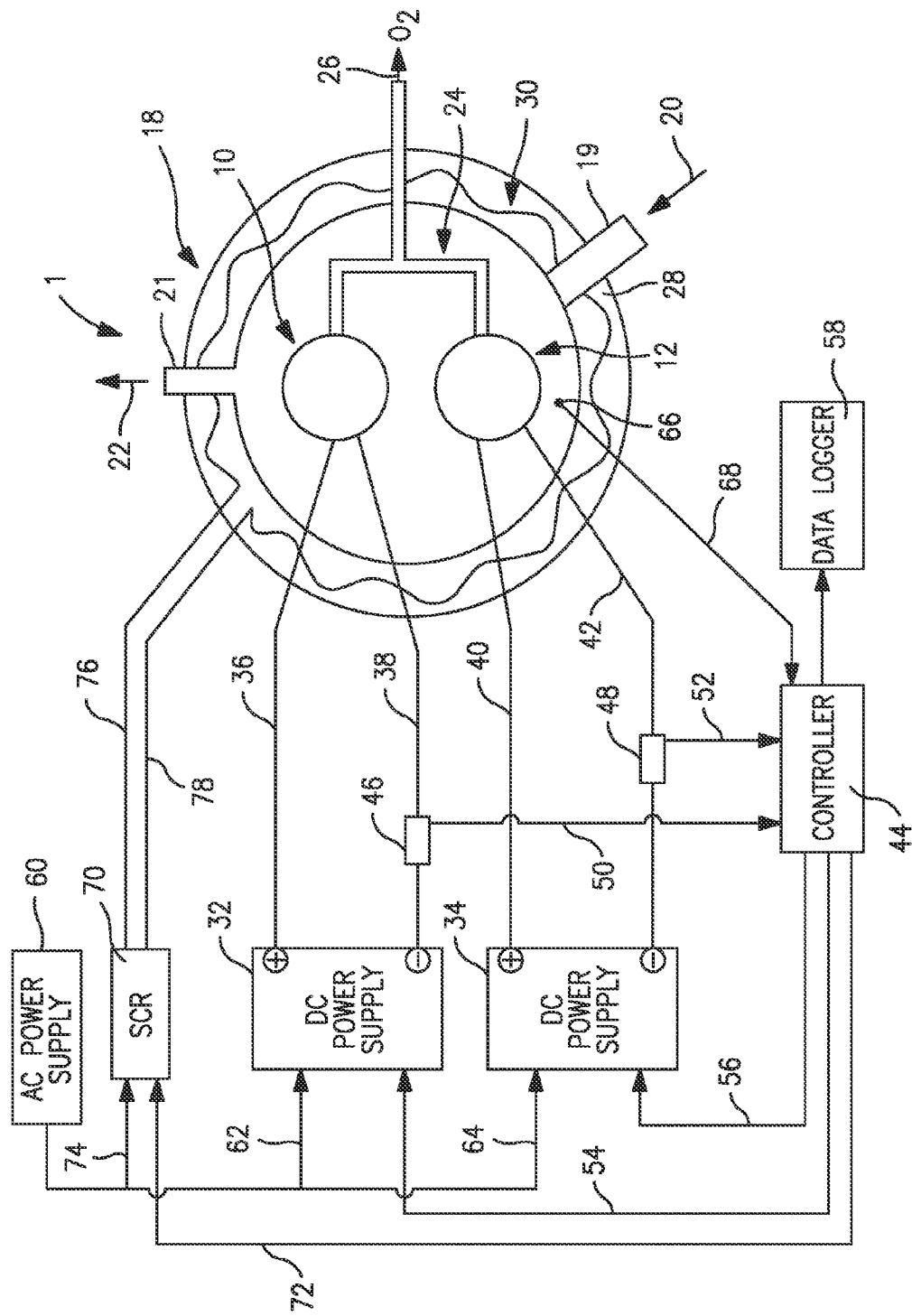
FIG. 1 is a schematic illustration of an apparatus for carrying out a method in accordance with the present invention.

With reference to FIG. 1, an electrically driven oxygen separation device 1 incorporating an electrical power supply in accordance with the present invention is illustrated. Electrically driven oxygen separation device 1 is illustrating as having a first composite membrane element 10 and a second composite membrane element 12 housed within an electrically heated enclosure 18.

The electrical power supply to the electrically driven oxygen separation device separation device 1 is illustrated as incorporating two separation zones. One of the two separation zones consists of a DC power supply 32, the first composite membrane element 10, an electrical current sensor 46 and the other of the two separation zones consists of a DC Power Supply 34, the second composite membrane element 12 and a second current sensor 48. Current sensor 46 and 48 could be a current sense resistor or any other current measurement device. Also the current measurement device could be integrated into power supply. Additionally, as will be discussed, associated with each of the zones is the electrical circuitry necessary to connected such components. It is understood, however, that the discussion of the two separation zones is for purposes of illustration only and the present invention contemplates, as claimed herein, only a single separation zone or a plurality of separation zones, each having their own DC power supply, composite membrane element, current sensor and electrical circuitry. Although only a single composite membrane element is illustrated in each zone, it is further understood that each zone could incorporate multiple composite membrane elements in any arrangement. The composite membrane element could have multiple membrane elements which are electrically arranged in series, parallel or combination of both.

There is no particular form the first and second composite membrane elements 10 and 12 that is preferred. As has been provided in the prior art, such elements may be in the form of a collection of plates or a molded ceramic element having integrally formed finger like elements projecting from a base-like element. All of such elements have cathode and anode electrodes and an electrolyte, such as described above, located between the electrodes to separate oxygen from an oxygen containing feed, for example air, through application of an electric potential difference in a manner that will be described hereinafter.

Figure 2:
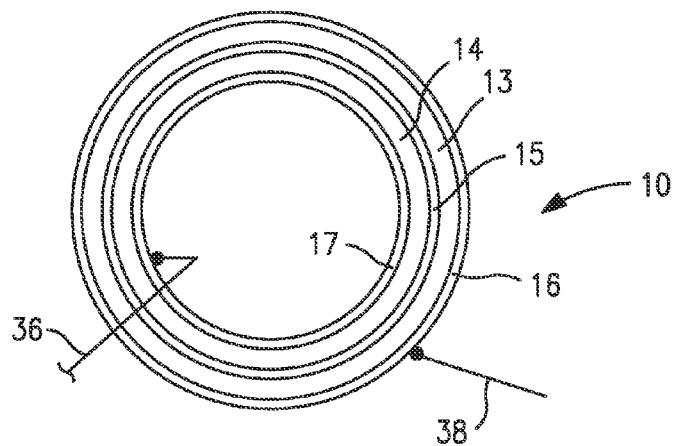
FIG. 2 is an enlarged, sectional fragmentary view of FIG. 1 illustrating details of a composite membrane element used in the apparatus of FIG. 1.

For purposes of illustration and with reference to FIG. 2, the first composite membrane element 10 is a composite layered structure having an outer cathode layer 13 on which the oxygen containing feed is contacted, an inner anode layer 14 within which the separated oxygen is collected and an electrolyte layer 15 between the cathode and anode layers 13 and 14 through which oxygen ion transport occurs. Two current collector layers 16 and 17 are provided, covering the cathode and anode layers 12 and 14 for application of the electrical potential difference to the cathode and anode layers 13 and 14. The first composite membrane element is in the form of a tube and although not illustrated, such tube at one end would have an outlet to discharge the oxygen and an electrical feed through to allow electrical contact to be made with the current collector 17 and therefore the anode layer 14. All of the current collector layers 16 and 17 and the cathode and anode layers 13 and 14 are porous to allow the oxygen to contact the electrolyte layer 15 and to allow the oxygen to diffuse from the electrolyte layer 15 to the inside of the first composite membrane element 10. The electrolyte layer 15 is not designed to be porous in that its purpose is to conduct oxygen ions through oxygen ion transport. While, for the purpose of this invention, there are no particular preferred materials for forming such layers, the same can utilize the same materials and in the same manner as that illustrated in US Patent Appln. Serial No. 2010/116133, discussed above.

Further bundles of manifolded composite membrane elements in tubular form could be used in the separation zones discussed above in accordance with such patent application.

In the illustrated embodiment, an electrically heated enclosure 18 is provided that has an inlet 19 for introduction of an oxygen containing feed stream 20 and an outlet 21 for discharge of an oxygen depleted retentate stream 22 that is formed by separation of the oxygen contained within the oxygen containing feed stream 20 by the first and second composite membrane elements 10 and 12. Although not illustrated, a blower or fan could be provided to motivate the flow of the oxygen containing feed stream 20 into inlet 19 and the interior of the electrically heated enclosure 18. In the illustrated embodiment, since there are two such of such elements, a manifold 24 is provided for collecting the oxygen separation from the oxygen containing feed stream that penetrates the electrically heated enclosure 18 for discharge of an oxygen product stream 26.

Electrically heated enclosure 18 is provided with an insulation layer 28 having embedded heating elements 30 for heating the first and second composite membrane elements 10 and 12 to an operational temperature at which the electrolyte contained in electrolyte layer 15 employed in such elements is capable of oxygen ion transport when an electric potential difference is applied to the first and second composite membrane elements 10 and 12. In accordance with the present invention, such potential difference is individually applied to the elements by first and second DC power supplies 32 and 34 that are each connected to the first and second composite membrane elements 10 and 12 by electrical circuits. Composite membrane 10 and 12 could have multiple membrane elements which are connected in series, parallel or combination of both. In preferred configuration, there are two bundles of membrane elements in a composite membrane 10 and 12 in which individual membranes are connected in series in each bundle. These two bundles are further connected in parallel connecting to one power supply. The electrical circuit used in connection with first composite membrane element 10 includes conductors 36 and 38 and the electrical circuit used in connection with the second composite membrane element 12 uses conductors 40 and 42. As could be appreciated, if there were more of such composite membrane elements, each could be separately powered or groups of such elements could have separate DC power supplies. The application of direct current by the DC power supplies 32 and 34 to the cathode and anode electrodes of first and second composite membrane elements 10 and 12, when heated to the operational temperature, typically, 600° C. to 800° C. by heating elements 30, causes ionization of the oxygen contained within oxygen containing feed stream 20 when contacted with the cathode electrodes, ionic transport through the electrolytes employed in such elements, and the production of oxygen, $O_2$, at the anode electrodes. As would be known to those skilled in the art, the applied voltage supplies electrons to ionize the oxygen at the cathode electrode and the electrons are shed by the oxygen ions at the anode in the recombination of the oxygen ions into molecular oxygen.

As has been discussed above, during operation of the composite membrane elements 10 and 12, for reasons discussed above, the performance of such elements will tend to deteriorate, namely, to reduce the production of oxygen. During such deterioration the resistance of the elements will increase. If a constant voltage were applied continuously over the life of the composite membrane elements 10 and 12, then the current drawn by the composite membrane elements 10 and 12 would reduce or decay with the increase in resistance as would the output of the oxygen given that oxygen production is a direct function of the electrical current being drawn by the elements. Here it is appropriate to point out that such current decay is not a linear function in that initially, the electrical current drawn by the composite membrane elements 10 and 12 will tend at first to increase as the elements "burn in". However, when viewed over a long operational time period, there will in fact be such current decay due to factors discussed above. In this regard, the invention as set forth in the appended claims is not intended to exclude such initial current increase. In any event, if such operation were allowed to continue, then eventually the applied voltage would increase until failure of the elements due to internal heating.

Figure 3:
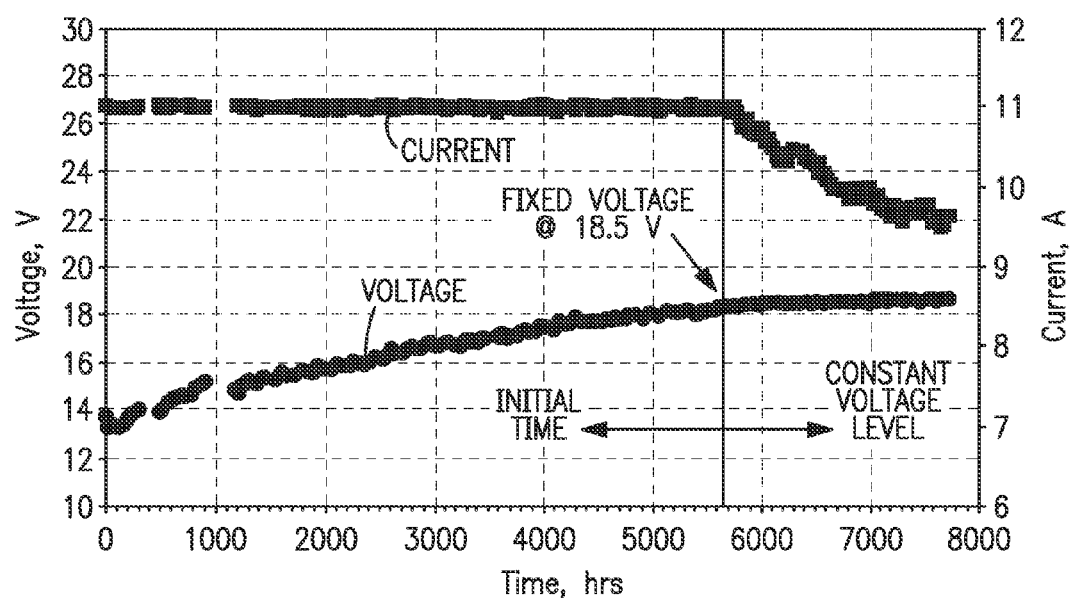
FIG. 3 is a graphical representation of the control of electrical potential difference and current applied to an composite membrane element of an electrically driven oxygen generation in accordance with the present invention.

With reference to FIG. 3, in accordance with the present invention, the potential difference applied to each of the oxygen separation elements, during an initial time of operation is allowed to increase or decrease (especially during burn in period) to maintain the current drawn by the composite membrane elements 10 and 12 at a constant level. When a maximum predetermined voltage is applied, the voltage is maintained at a constant level. When the voltage is so fixed, the resistance of the composite membrane elements 10 and 12 will continue to increase and the electrical current will decay. However, during such period of decay, oxygen will continue to be produced and thus, the electrically driven oxygen separation device 1 will be able to continue in service for a longer time period than prior art elements without maintenance. A point will be reached when the composite membrane elements 10 and 12 will have to be renewed; e.g. replaced. This point of renewal may be selected when the current decay reaches a percentage, for example 25 percent, of the predetermined operational current level that is maintained when the current is maintained at a constant level by increasing the voltage.

The foregoing is accomplished in the present invention my means of a programmable controller 44 that in one facet is programmed in a known manner to accomplish the foregoing operation. Inputs to the controller 44 are analogue current signals sensed by current sensors 46 and 48 associated with the electrical circuits described above powering the first and second composite membrane elements 10 and 12. Current sensors can be current sense resistors or any other commercially available current sensors. Such current measurement devices can alternatively be integrated into the power supply. The signals are transmitted to the controller 44 by means of electrical connections 50 and 52, respectively. The sensed current is processed by the controller 44 to produce voltage signals that are fed to the DC power supplies 32 and 34 by electrical connections 54 and 56. Controller 44 is designed to generate the voltage signals such that they each have an amplitude as a function of the levels of electric current drawn by the first and second composite membrane elements 10 and 12. The voltage that is in turn applied by the DC power supplies 32 and 34 is a function of such voltage signals. While linear programming techniques are possible, practically, controller 44 is programmed as a proportional integral differential controller or "PID" controller having tuning constants that are determined experimentally in a manner known in the art to produce a desired response and control stability to maintain the electrical current drawn by the first and second composite membrane elements 10 and 12 constant. When the voltage signals reach a predetermined level, the controller 44 is also programmed to not further update the voltage signals through PID control and all the voltage signals to remain at a constant level so that the DC power supplies 32 and 34 apply a constant voltage to the first and second composite membrane elements 10 and 12. As an example, DC power sources 32 and 34 may be units that can be of the type PBA300E-24 supplied by COSEL CO. LTD. of 1-6-43 Kamiakae-machi, Toyama 930-0816, Japan. Such units have an input voltage signal that can vary between 0 volts and 2.5 volts. The output voltage will vary as the input voltage signal between 0 and 24 volts. Assuming that the desired predetermined electric current level to be drawn by the first and second composite membrane elements 10 and 12 is 11.2 amperes, the voltage signal is allowed to rise to a predetermined maximum level of 1.875 volts that will cause the DC power supplies 32 and 34 to supply 18.5 volts to the first and second composite membrane elements 10 and 12. The controller 44 is programmed such that, at such point, the voltage signal will not be updated and the voltage signal will remain at 1.875 volts and as shown in FIG. 3, the electrically current drawn by first and second oxygen separation elements will decay as will the oxygen output. The maximum voltage level is selected to prevent damage and failure of the composite membrane elements 10 and 12.

As could be appreciated by those skilled in the art, constant current, DC power supplies are well known. Consequently, such a power supply could be used if it were designed to have a maximum voltage output below a level that would cause the composite membrane elements to fail. However, the design and construction of such a device would not be preferred given that the present invention, in this aspect, allows for the use of off-the-shelf equipment.

As mentioned above, when a predetermined level of current decay occurs, the first and second composite membrane elements 10 and 12 will be replaced. An indication of this may be obtained from a data logger 58 connected to controller 44 that may be a static random access memory, flash memory or EEPROM (Electrically Erasable Programmable Read-Only Memory) that will record such data as that referable to the electric current sensed by current sensors 46 and 48 and the voltage signals generated by controller 44. This data may be accessed remotely, for example, by a modem and telephone lines, to enable a determination to be made as to when first and second composite membrane elements 10 and 12 are to be replaced. Under certain circumstances, where phone lines are not accessible, the stored data could be collected using a PC and connecting it to the controller 44 using serial port connectors. As can be appreciated, other means could be used, for instance, a visual alarm indication by an LED lamp when the electrical current has decayed to the predetermined low current level. As may also be appreciated, in lieu of any indication, controller 44 and DC power supplies 32 and 34 could function without any external indication of the predetermined low current level. In such case, the operational time of first and second composite membrane elements 10 and 12 could be recorded and externally displayed and the renewal of the same would take place when a predetermined operational time had elapsed, for instance 7700 hours of operation as shown in FIG. 2.

Both the DC power supplies 32 and 34 and the heating elements 30 of electrically heated enclosure 18 are powered by an AC power supply 60 that can be line current. AC power supply 60 is connected to the DC power supplies 32 and 34 by power cords 62 and 64. In order to maintain the first and second composite membrane elements 10 and 12 at their operational temperature, a temperature sensor 66 is provided in electrically heated enclosure 18 to sense environmental temperature within such enclosure. Temperature sensor 66 can be a k-type thermocouple that generates an analogue temperature signal that is fed as another input into controller 44 by an electrical connection 68. In another facet of the programming incorporated into controller 44, controller 44 can be programmed to generate a temperature control signal that is responsive to the temperature signal and is fed to a silicon controlled rectifier 70 by means of an electrical connection 72. The AC power supply 60 is connected to the silicon controlled rectifier 70 by means of a power cord 74 and the silicon controlled rectifier 70 is in turn connected to electric heating elements 30 by means of electrical conductors 76 and 78. When controller 44 generates the temperature control signal, the silicon controlled rectifier 70 acts as a switch that connects the AC power source 60 to the heating elements 30 and heat is supplied within electrically heated enclosure 18. Other known means in place of the silicon controlled rectifier 70 could be used such as Solid State Relays (SSR) or programmable heater controllers that are readily obtainable from a variety of manufactures.

During steady state operation, the controller 44 is programmed to supply the temperature signal when the temperature sensed by temperature sensor 66 is below the operational temperature and to not supply such a signal when the temperature sensed by temperature sensor is above the operational temperature. Again, the programming logic used for such control is proportional, integral, differential control although, again, linear programming is possible.

The program incorporated into controller 44 can in another facet of its programming can also be designed, in a manner known in the art to incorporate a startup routine to control operation of the composite membrane elements 10 and 12 and the electrically heated enclosure 18 during startup operations. As an initial step in the program routine, controller 44 is programmed such that no voltage is applied to first and second composite membrane elements 10 and 12 and hence the voltage signal is 0 while the temperature signal is intermittently generated until the operational temperature level is obtained within the heated enclosure 18. For example, using PID control, the controller 44 could execute every minute with a floating set point that increased 5° C. after each execution until the operational temperature were obtained, for example, 675° C. This would provide a ramp up in the temperature of 5° C. per minute and from ambient temperature conditions would take about two hours. This operation ensures the gradual heating of the first and second composite membrane elements 10 and 12 to prevent damage to the same. As would be known, the first and second composite membrane elements 10 and 12 will also self-heat in accordance with a function of the electric current be drawn multiplied by the resistance. Again, to prevent damage, once the operational temperature has been obtained, during the start up operation, controller 44 is programmed to generate the voltage signal at gradually increasing levels, for example to provide an increase in current at 0.05 ampere/second so that the voltage that is applied to the first and second composite membrane elements 10 and 12 will gradually increase and the self-heating of such elements will not, when taken in connection with the heat supplied by heating elements 30 overheat the elements. Controller 44 is also programmed such that the first composite membrane element 10 is first powered up before the second composite membrane element 12. When the applied current to the first composite membrane element 10 reaches a predetermined level, for instance, 75 percent of design, the potential difference is gradually applied to the second composite membrane element 12. As could be appreciated by those skilled in the art, if several of such elements were used, they could be powered up in a sequential schedule as described with reference to first and second composite membrane elements 10 and 12 or sequentially in groups of such elements.

As can be appreciated, the present invention also contemplates less sophisticated control or no control at all. For example, the programmable logic controller 44 could be programmed without the startup routine and with no temperature control of the electrically heated enclosure 18. In such case, enclosure 18 is heated using AC power supply 60 along with separate commercially available programmable heater controller, for example Watlow. The insulated enclosure 18 and composite membrane elements used would have to be closely matched to prevent overheating.

Although the present invention has been described with reference to a preferred embodiment, as will occur to those skilled in the art, numerous changes, additions and omissions in such preferred embodiment without departing from the spirit and scope of the present invention as set forth in the appended claims.

We claim:

1. A method of controlling application of electrical power in an electrically driven oxygen separation device, said method comprising:

applying part of the electrical power in at least one separation zone of the electrically driven oxygen separation device having at least one composite membrane element by applying an electrical potential difference to anode and cathode electrodes of the at least one composite membrane element while heating the at least one composite membrane element to an operational temperature, thereby to separate the oxygen from the oxygen containing feed stream by inducing oxygen ion transport in an electrolyte situated between the anode and cathode electrodes through the application of the electrical potential difference;

the at least one composite membrane element having a resistance increasing over time and during operation of the at least one composite membrane element; and controlling the electrical potential difference applied to the at least one composite membrane element such that an electric current drawn by the at least one composite membrane element remains at a substantially constant, predetermined electrical current level by increasing the electrical potential difference as the resistance increases until the electrical potential difference reaches a predetermined voltage level and thereafter, maintaining the electrical potential difference at a constant voltage level when the electrical potential difference reaches the predetermined voltage level, the constant voltage level being below a maximum voltage level at which the at least one composite membrane element will fail.

2. The method of claim 1, wherein the electrical potential difference is controlled by measuring the electric current and increasing the electrical potential difference such that the electrical current remains at the substantially constant, predetermined electrical current level.

3. The method of claim 2, wherein:

the electric current decays over time when the electrical potential difference is maintained at the constant level; and when the electrical current has decayed to a predetermined low electric current level, the application of the electrical potential difference ceases and the at least one composite membrane element is replaced.

4. The method of claim 1 or claim 3, wherein:

the at least one separation zone comprises a plurality of separation zones;

the at least one composite membrane element of each of the plurality of separation zones is contained in an electrically heated enclosure of the electrically driven oxygen separation device to heat the electrolyte to the operational temperature at which the electrolyte will be capable of oxygen ion transport;

a further part of the electrical power is initially gradually supplied to the electrically heated enclosure during startup of the electrically driven oxygen separation device to gradually obtain the operational temperature within the electrically heated enclosure prior to applying the electrical potential difference; and after the operational temperature has been obtained, during the startup of the electrically driven oxygen separation device, the electric potential difference is separately and gradually applied within each of the separation zones until the electrical current reaches the predetermined electrical current level and in accordance with a schedule having the electrical potential difference successively applied within the plurality of separation zones such that the electrical potential is applied within a successive separation zone only after the current drawn by the at one composite membrane element located within a preceding separation zone has reached a fixed percentage of the electrical current level and with the further part of the electrical power supplied to the electrically heated enclosure only supplied as necessary to maintain the operational temperature.

5. An apparatus for applying electrical power in an electrically driven oxygen separation device, said apparatus comprising:

at least one separation zone having a DC power source for generating part of the electrical power and at least one composite membrane element housed within an electrically heated enclosure of the electrically driven oxygen separation device and connected to the DC power source such that an electrical potential difference is applied to anode and cathode electrodes of the at least one composite membrane element, thereby to separate the oxygen from the oxygen containing feed stream by inducing oxygen ion transport in an electrolyte situated between the anode and cathode electrodes through the application of the electrical potential difference;

an AC power supply connected to the electrically heated enclosure for generating a further part of the electrical power and supplying the further part of the electrical power to the electrically heated enclosure to maintain the at least one composite membrane element at an operational temperature at which the electrolyte is capable of oxygen ion transport;

the at least one composite membrane element having a resistance increasing over time and during operation of the at least one composite membrane element; and means for controlling the electrical potential difference applied to the at least one composite membrane element such that the voltage of the electrical potential increases to maintain an electric current drawn by the at least one composite membrane element at a substantially constant, predetermined electrical current level as the resistance increases until the electrical potential difference reaches a predetermined voltage level and thereafter, to maintain the electrical potential difference at a constant voltage level when the electrical potential difference reaches the predetermined voltage level, the constant voltage level being below a maximum voltage level at which the at least one composite membrane element will fail.

6. The apparatus of claim 5, wherein the electrical potential controlling means comprises:

the separation zone having a current sensor connected between the at least one power supply and the at least one electrically driven oxygen membrane element and configured to generate a current signal referable to a magnitude of the electrical current drawn by the at least one composite membrane element;

the DC power supply responsive to a input voltage control signal and configured such that the electrical potential difference applied has an amplitude that varies in response to the input voltage control signal; and a programmable controller responsive to the current signal and programmed to generate the voltage control signal such that the electric current drawn by the at least one composite membrane element is maintained at the substantially constant, predetermined electrical current level as the resistance increases and to maintain the electrical potential difference at the constant voltage after the electrical potential difference reaches the predetermined voltage level.

7. The apparatus of claim 6, wherein:

the electric current decays over time when the electrical potential difference is maintained at the constant level; and means for recording and accessing data referable to the electric current drawn by the at least one composite membrane element is connected to the controller such that when the electrical current has decayed to a predetermined low electric current level and indication is supplied for replacement of the at least one composite membrane element.

8. The apparatus of claim 6 or claim 7, wherein:

the at least one separation zone comprises a plurality of separation zones;

means for controlling the supply of the further part of the electrical power generated by the AC power source is connected between the AC power source and the electrically heated enclosure and is responsive to a temperature control signal;

a temperature sensor is contained in electrically heated enclosure and is configured to generate a temperature signal referable to temperature within the electrically heated enclosure;

the programmable controller is programmed to generate the voltage control signal for each said DC power source in response to the electrical current signal of each of the plurality of separation zones and is also responsive to the temperature signal to generate the temperature control signal such that the operational temperature is maintained in the heated enclosure; and the programmable controller programmed with a startup routine executing during startup of the electrically driven oxygen separation device to generate the temperature control signal and the voltage signal such that the further part of the electrical power generated by the AC power supply is gradually applied until the operational temperature is obtained within each of the plurality of separation zones, the electric potential difference is separately and gradually applied to the at one composite membrane element in each of the separation zones, once the operational temperature has been obtained, until the electrical current drawn reaches the predetermined electrical current level and in accordance with a schedule having electrical potential difference successively applied within the separation zones such that the electrical potential is applied within a successive separation zone only after the current drawn by the at one composite membrane element located within a preceding separation zone has reached a fixed percentage of the electrical current level and with the further part of the electrical power supplied to the electrically heated enclosure only supplied as necessary to maintain the operational temperature.

\* \* \* \* \*